(12) United States Patent
Wright et al.

(10) Patent No.: US 10,602,058 B2
(45) Date of Patent: Mar. 24, 2020

(54) CAMERA APPLICATION

(71) Applicant: BEEZBUTT PTY LIMITED, Newtown, New South Wales (AU)

(72) Inventors: Paul Wright, Kenthurst (AU); Catherine Montoya, Gladesville (AU); May Hnin Phyu, South Granville (AU); Erick Haryono, Campsie (AU); Jeong Kwang Nam, Lidcombe (AU); Charbel Anthony Zeaiter, Pennant Hills (AU)

(73) Assignee: BEEZBUTT PTY LIMITED, Newtown (AU)

( * ) Notice: Subject to any disclaimer, the term of this patent is extended or adjusted under 35 U.S.C. 154(b) by 0 days.

(21) Appl. No.: 15/521,325

(22) PCT Filed: Oct. 26, 2015

(86) PCT No.: PCT/AU2015/050660
§ 371 (c)(1),
(2) Date: Apr. 24, 2017

(87) PCT Pub. No.: WO2016/061634
PCT Pub. Date: Apr. 28, 2016

(65) Prior Publication Data
US 2017/0310888 A1 Oct. 26, 2017

(30) Foreign Application Priority Data
Oct. 24, 2014 (AU) .................. 2014904256

(51) Int. Cl.
*H04N 5/232* (2006.01)
*H04N 5/77* (2006.01)
(Continued)

(52) U.S. Cl.
CPC ....... *H04N 5/23229* (2013.01); *G06F 3/0484* (2013.01); *G06F 3/04817* (2013.01);
(Continued)

(58) Field of Classification Search
CPC .............. H04N 5/23229; H04N 5/772; H04N 5/23293; G06F 3/0484; G06F 3/04817
See application file for complete search history.

(56) References Cited

U.S. PATENT DOCUMENTS 5,943,093 A * 8/1999 Anderson ............... G06F 3/005
348/231.6
6,977,679 B2 12/2005 Tretter et al.
(Continued)

FOREIGN PATENT DOCUMENTS

JP 2013 179562 A 9/2013

OTHER PUBLICATIONS

Supplementary European Search Report of Application No. EP 15 85 3005 dated Nov. 2, 2018.

*Primary Examiner* — Timothy J Henn
(74) *Attorney, Agent, or Firm* — Gordon & Jacobson, P.C.

(57) ABSTRACT

A camera application executable on a camera enabled device, such as a smartphone, can include an image capture interface used to record the live image displayed on a display screen of the device. The image capture interface can also display multiple album icons that can be actively associated with an image capture function. The album icons may correspond to attribute sets including a folder into which recorded images may be stored. The album icons operate as individual shutter buttons that cause the camera application to record the image and apply one or more attributes of the respective album to the recorded image. The attributes may include storage attributes as well as sharing attributes.

16 Claims, 17 Drawing Sheets

(51) Int. Cl.
*G06F 3/0481* (2013.01)
*G06F 3/0484* (2013.01)

(52) U.S. Cl.
CPC ..... *H04N 5/23216* (2013.01); *H04N 5/23225* (2013.01); *H04N 5/23293* (2013.01); *H04N 5/772* (2013.01)

(56) References Cited

U.S. PATENT DOCUMENTS

| | | | | |
|---|---|---|---|---|
| 8,754,948 B2* | 6/2014 | Wasula | | H04N 1/2112 |
| | | | | 348/207.1 |
| 2003/0007078 A1* | 1/2003 | Feldis, III | | G11B 27/105 |
| | | | | 348/231.6 |
| 2004/0109063 A1* | 6/2004 | Kusaka | | H04N 1/00477 |
| | | | | 348/207.1 |
| 2005/0001904 A1* | 1/2005 | Kiiskinen | | G06F 17/30265 |
| | | | | 348/207.1 |
| 2005/0083406 A1* | 4/2005 | Cozier | | G06Q 10/107 |
| | | | | 348/207.1 |
| 2005/0256943 A1 | 11/2005 | Morris | | |
| 2007/0067295 A1 | 3/2007 | Parulski et al. | | |
| 2008/0079834 A1* | 4/2008 | Chung | | H04N 1/00411 |
| | | | | 348/333.12 |
| 2010/0277635 A1* | 11/2010 | Kim | | H04N 1/00236 |
| | | | | 348/333.01 |
| 2011/0061016 A1* | 3/2011 | Song | | H04L 63/107 |
| | | | | 715/779 |
| 2011/0081952 A1* | 4/2011 | Song | | H04N 1/00307 |
| | | | | 455/566 |
| 2012/0226663 A1* | 9/2012 | Valdez Kline | | G06F 17/30017 |
| | | | | 707/640 |
| 2013/0120592 A1* | 5/2013 | Bednarczyk | | H04N 5/765 |
| | | | | 348/207.1 |
| 2013/0182133 A1* | 7/2013 | Tanabe | | H04N 5/23203 |
| | | | | 348/207.11 |
| 2013/0332841 A1* | 12/2013 | Gallet | | G06F 3/0481 |
| | | | | 715/738 |
| 2014/0028885 A1* | 1/2014 | Ma | | H04N 5/23216 |
| | | | | 348/333.01 |
| 2014/0032726 A1* | 1/2014 | Liang | | H04L 67/06 |
| | | | | 709/222 |
| 2014/0067883 A1* | 3/2014 | Fujita | | G06F 17/30123 |
| | | | | 707/821 |
| 2014/0118598 A1* | 5/2014 | Kim | | H04N 5/23216 |
| | | | | 348/333.02 |
| 2014/0160316 A1 | 6/2014 | Hwang | | |
| 2014/0304019 A1* | 10/2014 | Scott | | G06Q 10/06311 |
| | | | | 705/7.15 |
| 2014/0375862 A1* | 12/2014 | Kim | | H04N 5/23245 |
| | | | | 348/333.02 |
| 2016/0050289 A1* | 2/2016 | Cohen | | H04L 67/30 |
| | | | | 709/204 |

* cited by examiner

CAMERA APPLICATION

BACKGROUND OF THE INVENTION

1. Field of the Invention

The present invention relates to camera applications and in particular, though not exclusively, to camera applications of mobile telephones, tablets and other communications enabled devices.

2. Description of Related Art

Digital cameras have become ubiquitous in portable computing devices in particular in mobile telephones and tablets. Consequently, users take large numbers of photos. Social media sites including Facebook, Snapchat and the like encourage users to share photos and this has led to an even larger increase in the number of photos that users create.

One problem with existing camera applications is that captured photos need to be organised and categorised. These tasks are typically performed immediately after a photo is taken, e.g. by prompting a user to identify faces in a photo, tag the photos with names or subjects, or share the photo on a social media application. Requiring the user to provide a series of inputs and selections for each individual photo at the time the photo is taken can be a burden, in particular in a quick snapshot scenario or if many photos are being taken within a session. Many users therefore opt to leave the photos in default storage on the device and transfer and/or process the photos at a later time.

Processing of photos well after the photo capture event may be performed by viewing photos on the device or in a viewer on another computer, possibly of larger screen size. In many cases, photos are left in the device storage until such time as many tens or hundreds of photos have accumulated. Processing of such large numbers of photos is time consuming and thus many users simply fail to process and categorize their photos in any meaningful manner. This can lead to difficulties in referring to their photo library for searching or reviewing. A further problem is that the user may store more photos than is required leading to excess storage costs, in particular if the customer has got auto sync to a cloud storage provider. A major problem which mobile device users encounter is that pictures and videos exhaust the device internal storage space because users rather leave them on the device than to download the vast amount of un-organized pictures. Users scroll through a large amount of pictures in order to find the image or video needed at the time which is time consuming and frustrating.

What is required is an improved system and method for capturing and processing digital images.

SUMMARY OF THE INVENTION

In one aspect, there is provided a camera device including at least one processor and a camera application executable by the at least one processor of the camera device. The camera application may include an image capture function that can be activated by a user and an interface that displays a plurality of attribute sets for allowing a user to select at least one of the plurality of attribute sets to be associated with the image capture function. The camera application may be programmed such that when the image capture function is activated, the camera application records an image with at least one camera of the camera device and applies at least one attribute of the one or more attribute sets associated with the image capture function to the recorded image.

In one aspect, there is provided a method for capturing and processing a digital image on a camera device programmed to execute an image capture function. The method may include displaying a plurality of attribute sets for allowing a user to select at least one of the plurality of attribute sets to be associated with the image capture function, executing the image capture function to record an image with at least one camera of the camera device, and applying at least one attribute of the at least one attribute sets associated with the image capture function to the recorded image.

In one aspect, there is provided a method for capturing and processing a digital image on a device including invoking a camera application on the device; displaying a plurality of shutter buttons on an image capture interface, each shutter button including an associated attribute set, each attribute set including one or more attributes; detecting a user selection of one of the plurality of shutter buttons; recording an image with at least one camera of the device in response to detecting the user selection; and applying one or more of the attributes of the attribute set associated with the selected shutter button to the recorded image.

In one aspect, there is provided a digital camera enabled device including at least one digital camera for recording an image, the device including at least one processor that executes a camera application, the camera application programmed to display a plurality of shutter buttons on an image capture interface, each shutter button including an associated attribute set, each attribute set including one or more attributes; detect a user selection of one of the plurality of shutter buttons; record an image with at least one of the digital cameras of the device in response to detecting the user selection; and apply one or more of the attributes of the attribute set associated with the selected shutter button to the recorded image.

In one aspect, there is provided a method for capturing and processing a digital image on a device including invoking a camera application on the device; in response to the camera application being invoked on the device, displaying on a display of the device, by the camera application, an attribute selection display that prompts the user to select at least one attribute set; in response to receiving a selection of at least one attribute set, commencing an image recording session by the camera application; recording one or more images for the image recording session; for each attribute set of the at least one attribute set applying, by the camera application, one or more attributes of the respective attribute set to the one or more images; and ending the image recording session by the camera application.

In one aspect, there is provided a digital camera enabled device including at least one digital camera for recording an image, the device including at least one processor that executes a camera application, the camera application programmed to invoke a camera application on the device; in response to the camera application being invoked on the device, display on a display of the device, by the camera application, an attribute selection display that prompts the user to select an attribute set; in response to receiving a selection of an attribute set, commence an image recording session by the camera application; record one or more images for the image recording session; apply, by the camera application, one or more attributes of the selected attribute set to the one or more images; and end the image recording session by the camera application.

In one aspect, there is provided a digital camera application executable on a digital camera enabled device, the digital camera application programmed to: display, on a display screen of the device, a live output of a camera sensor of the device and a plurality of individually selectable camera shutter buttons, each of the camera shutter buttons including a unique associated attribute set including one or more attributes; detect a selection of one or more of the camera shutter buttons; capture the live output of the camera sensor; and apply the one or more attributes of the attribute set associated with the one or more of the camera shutter buttons to the captured output of the camera sensor.

BRIEF DESCRIPTION OF THE DRAWINGS

Further preferred embodiments of the invention will now be described with reference to the accompanying drawings, in which.

DETAILED DESCRIPTION OF PREFERRED EMBODIMENTS

Figure 1:
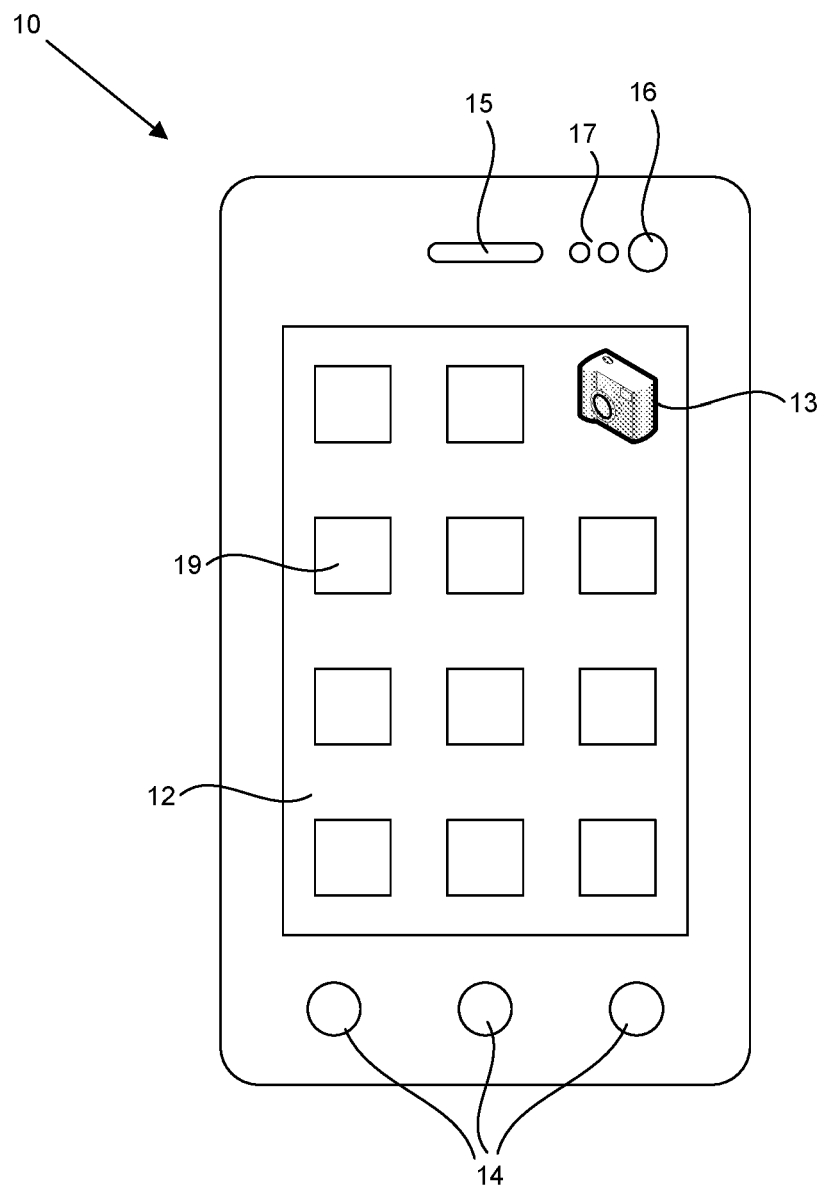
FIG. 1 schematically depicts a camera enabled device in the form of a Smartphone.
Figure 2:
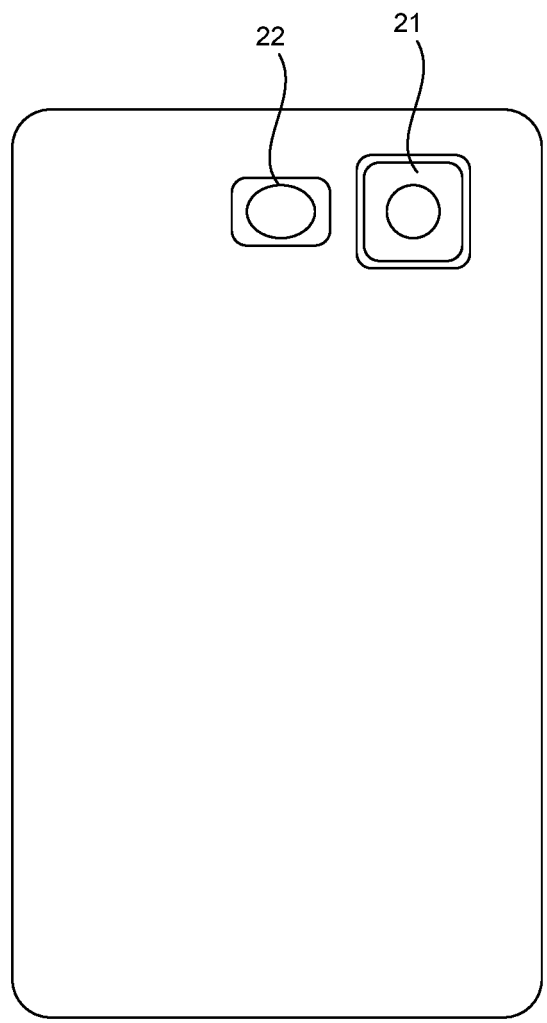
FIG. 2 schematically depicts the rear side of the device of FIG. 1.

FIGS. 1 and 2 show a camera enabled device. The device 10 is depicted as a mobile telephone however all manner of camera enabled devices are considered to be encompassed by the present invention. Such devices will include, without limitation, digital cameras, movie cameras, tablets, laptops, etc. FIG. 1 shows a front face of the device 10 including a display screen 12, a plurality of navigation buttons 14, an earpiece or front speaker 15, a front camera lens 16 and a proximity/light sensor 17. The display screen 12 may be a capacitive touch screen that is operated by finger touch of a user, a pixel pen or equivalent device. Other types of displays are possible including, without limitation, resistive touch screens, LCD screens, etc. The particular type of display screen 12 is not considered to be essential to the present invention.

FIG. 2 shows the reverse side of the device 10 and includes a rear camera lens 21 and flash 22. In addition to the described and illustrated features, the typical camera enabled device will include additional external features including, without limitation, volume key, battery indicator light, microphone, GPS antenna, headset jack, power key, reset key, lock key, external speaker and antenna, multifunction jack, charging port, USB port, etc.

Some or all of the described features will be necessary for the device to perform camera functions, communications functions or other device functions dependent on the device and are thus well known. These features are not considered pertinent to the present invention and thus no further description of such features is considered necessary herein for fully describing the invention.

Figure 3:
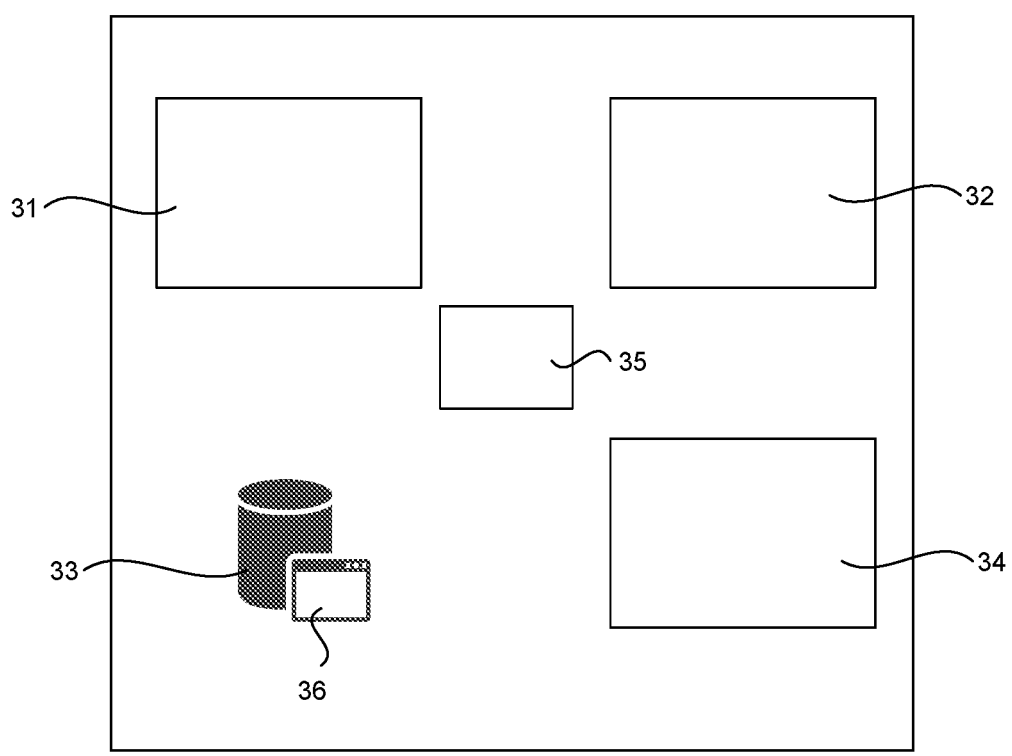
FIG. 3 schematically depicts some of the internal components of the device of FIG. 1.

Internally, as depicted schematically in FIG. 3, a typical camera enabled device 10 will include at least one processor 31, an operatively associated processing memory 32 used in the execution of programs and applications, an application storage 33, data storage 34 and an image sensor 35. The computing power and speed of these components will typically be dependent on the overall requirements of the device, rather than being determined by the camera related functions of the device. These components may communicate with one another on any suitable architecture as will be apparent to the person skilled in the art.

The device 10 may be configured for communication on a network. The device may therefore include additional components and associated processing software necessary for operating the device 10 as a communication device, e.g. via a mobile telephone network, internet, LAN, peer-to-peer network, Bluetooth™ network, etc. Such communications components, e.g. encoders, decoders, transmitters, receivers, etc. are considered well known and the specific form and function of such communication components are not considered to be pertinent to the present invention. Thus, no further description of the communications components of the device are considered to be required herein. In various embodiments, it is not essential that the device 10 have communications capabilities.

The application storage 33 may be a memory that stores application code for one or more applications executable by the processor 31. Each application may be depicted by an icon 19 on the display screen 12. FIG. 1 shows a plurality of generic icons 19 on a first page depicted on display screen 12 that may be associated with any of a wide variety of applications. The display screen 12 may depict multiple pages that display a plurality of application icons. An application may be invoked when the respective icon 19 is selected. For example, for a touch screen device, an application may be invoked by touching the appropriate icon on the display screen. When invoked, the application will be loaded from the application store 33 into the processing memory 32 and begin execution according to its programmed set of instructions or programming code.

The data storage 34 may store various data items such as, without limitation, address book and contacts, music files, image files (e.g. digital photo files or movie files), web page history, documents, downloaded content, game data, etc. Some or all of the data items may be organised into folders, albums or the like to allow the user to categorize the data items. Folders may be preconfigured or may be created by the user.

While depicted jointly in FIG. 3, the image sensor 35 may include separate image sensors for each of the front or rear camera lenses 16, 21. The image sensors 35 may be a CCD or CMOS sensor as is known in the art.

The application storage 33 may store a camera application 36 that can be invoked by selecting a camera application icon 13 on the display screen 12. The camera application 36 is programmed to control the camera components of the device 10 and associated functions. As per prior art camera applications, the camera application 36 will capture or record the live output of the image sensor 35 and store the image in the data storage 34. The captured/recorded image may be a static image, e.g. photo image, or a moving image, e.g. movie. The camera application 36 may be programmed to control aspects of the image recording, such as focus, zoom, viewport, shutter (image capture), filter settings, flash, image capture mode (picture, movie, burst mode, panoramic), etc. The camera application 36 may also be programmed for post-processing of the image, including filter settings, face recognition, image tagging, etc.

Some or all of these functions and capabilities of the camera application may be controlled through one or more control and/or settings buttons of the device. The control and setting functions may utilize the navigation buttons of 14 of the device 10 or may utilize additional software buttons that are displayed on the display 12 as part of the camera application 36.

The camera application 36 may control which of the front or rear camera lenses 16, 21 is in use. A toggle key may be provided on the display screen for the camera application to toggle between the front 16 and rear 21 lenses.

The camera application 36 may record images including static images and moving images. Digital photo images may be captured by the camera application 36 and stored in one or more of a plurality of electronic formats. Example formats include .raw, .jpg, .bmp, .tiff to name a few. Digital movie images may also be captured and stored in a plurality of video formats including, without limitation, .mpg, .flv, .avi, .wmv.

In a typical prior art camera application, when a user invokes the camera application, e.g. by selecting the camera application icon 13 from an applications page of the display screen 12, the camera application immediately displays an image capture screen or image capture interface that displays a live image as recorded via the currently selected camera device, i.e. front lens 16 or rear lens 21. The initially selected lens may be a default initial lens or may be the lens last used. Other parameters may likewise be set to initial settings or to default settings, e.g. camera mode or video mode, zoom settings, default storage folder, etc. If the user desires to change any of these settings, the user is required to make adjustments through selection of settings and control buttons prior to taking the image. Likewise, once a user has taken an image, any post-processing of the image, such as sharing, sorting or otherwise categorising the image, requires the user to make the appropriate selections on the camera application interface or through an image viewing application, such as PhotoViewer, Gallery, etc.

Figure 4:
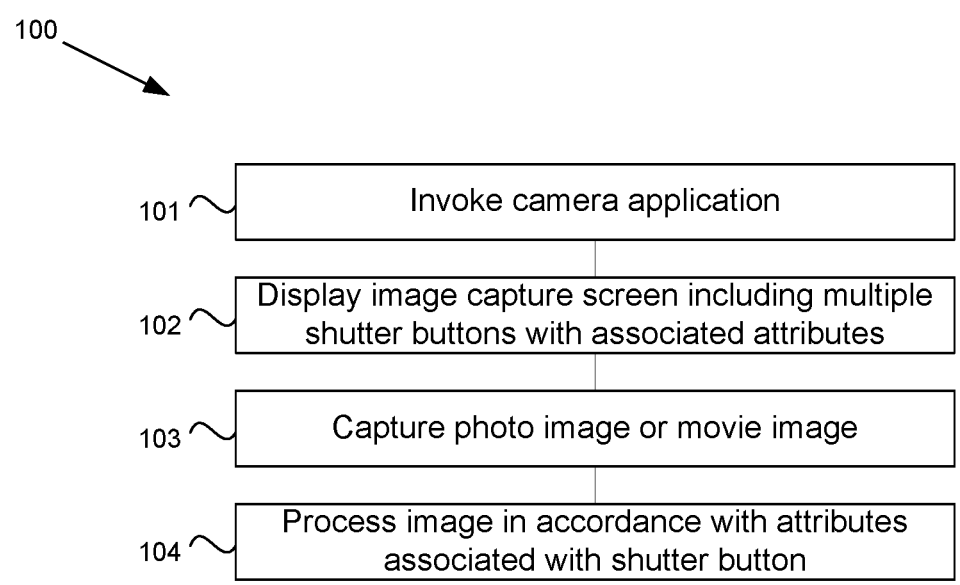
FIG. 4 is a flowchart of an image capture method using the device of FIG. 1.

A method performed by an enhanced camera application in accordance with an embodiment of the present invention is depicted in the flowchart 100 of FIG. 4. At step 101, the camera application 36 is invoked e.g. by selecting a camera application icon for the enhanced camera application. If the device 10 is a dedicated camera device as opposed to, say, a Smartphone, invoking the camera application may be automatic when switching the camera on or when switching the camera from a static viewing mode to an image capture mode. In response to invocation of the enhanced camera application, the enhanced camera application commences execution by initially displaying an image capture screen or interface (step 102). The image capture interface is the interface presented or displayed to the user as the user takes a photo. Typically, the image capture interface represents a viewfinder and more typically, the viewfinder displays a live output of the camera sensor.

A prior art image capture screen would display a single shutter button that is used to record a photo image, or, in the case of a movie, commence recording of a movie file. In the present embodiment however, the image capture screen displays a plurality of shutter buttons. The shutter buttons may be displayed as a side bar on the display screen 12, as will be described in more detail below. The shutter buttons may be software buttons that are actioned when an overlying area of a touch screen is tapped by the user or otherwise selected. Alternatively, the shutter buttons may be hardware buttons that are configured for their respective actions by the camera application. Each shutter button may be associated with an attribute set that contains one or more attributes that will be applied to a recorded image. Each set of attributes may be unique to the particular shutter button. The set of attributes may determine how an image to be recorded is pre-treated and/or post-treated. For example, the set of attributes may specify one or more filters that are applied when taking the image as well as where the image is stored and whether or not the image is to be shared.

At step 103, the user takes an image by selecting one of the desired shutter buttons. An image, i.e. a photo or movie file, is then recorded and processed in accordance with the attributes pertaining to the selected shutter button (step 104).

An attribute set may be a list or set of attributes that can be applied to an image file that is recorded during an image capture event. The attribute set may contain one or more attributes. In its simplest form, an attribute set may have a single attribute that specifies a folder for storing a captured image.

In a more complex embodiment, one or more attributes of an attribute set may specify one or more folders on the device in which the image will be recorded. An attribute set may also specify whether recorded images are to be synchronized or shared in folders on other devices of the user as well as one or more folders of the devices to which the images will be copied. Devices may be specified by a specific address, e.g. a network address, or by an alias, e.g. home computer.

One or more attributes of an attribute set may specify sharing attributes for an image. A sharing attribute may specify that a folder and/or an image within the folder is public, limited to a defined list of others, or limited to the user. Other sharing attributes will be apparent to a person skilled in the art. A folder and/or image may be shared through a social media account, e.g. Facebook™, Twitter™, etc. When a sharing attribute is applied, the image may be uploaded from the communications device through a suitable network connection to an account of the social media website. The attribute may include one or more sub-attributes including, without limitation, the social media website(s), the user's account details, a network availability attribute (e.g. upload only when a Wi-Fi connection is available), whether the recorded image is automatically shared and whether confirmation of sharing is required.

One or more attributes of an attribute set may specify a sizing parameter. When a sizing attribute is applied, the image may be resized according to the sizing parameter. For example, the sizing parameter may specify a maximum size for photo files. Alternatively or in addition, the sizing parameter may specify that video files above a specified size are to be compressed using a specified or default compression algorithm. A sizing attribute may further specify that only images that are to be communicated elsewhere, e.g. to another device, other user or social media website, are to be resized.

One or more attributes of an attribute set may specify a timing parameter. When a timing parameter is applied, the images of the image recording session may have an action associated with the image that is performed in accordance with the timing parameter. In one specific example, a timing parameter may specify that an image is to be shared for a specified time period. In another example, the timing parameter may specify that the image is to be deleted from the device after a specified time period.

One or more attributes of an attribute set may specify whether the attribute set is represented in an album dock or folder list on the image capture interface. This attribute allows a user to toggle attribute sets on and off as active image capture folders.

One or more attributes of an attribute set may specify synchronization parameters. The synchronization parameters may specify one or more synchronization accounts or albums (e.g. cloud based storage), allowable synchronization networks (WiFi, mobile, near-field, etc.), timing of synchronization, confirmation required, etc. By having synchronization settings linked to shutter buttons, the process of synchronizing can be made more efficient for the user. For example, a user may have a work based album/shutter button that is synchronized to a work based cloud storage account using any available network and a personal album that is synchronized to the user's home computer only via a cable plug-in.

The attribute set may also specify pre-processing and/or post-processing functions that can be performed on captured images, including any of the functions described above.

Different attribute sets may contain common attributes. For example, a first attribute set may specify a first folder on the device for storing the images and that the images are to be uploaded and shared on a social media website. A second attribute set may specify the same folder for storing the images on the device but that the images are not to be shared. That is, the storage folder is a common attribute of both attribute sets while the sharing attribute is not common to both attribute sets. Overall, a complete set of attributes will typically be unique because duplicated attribute sets will be redundant. The camera application software may periodically sweep all of the folder settings to check for redundant attribute sets.

The camera application may be programmed to apply at least some the attributes associated with a shutter button as the image is recorded, e.g. the storage folder. Alternatively, the camera application may be programmed to apply the attributes at a later time, e.g. upon termination of the camera application. In some instances, it may be practical to apply some attributes as soon as an image is recorded, e.g. for storing the image, while other attributes, e.g. resizing and sharing an image to other devices, may be more practically applied at the closure of the image recording session, or when a network connection becomes available. Logic and coding of the camera application may dictate in which order the attributes are to be applied. For example, a resizing attribute will typically be applied before a sharing attribute.

Images may be stored in association with their attributes. In addition, images communicated to other devices, users or accounts may be communicated with their associated attributes.

It will be apparent to the person skilled in the art that an attribute set may contain a vast and complex array of attributes. Attributes may also be conditional attributes that are applied only when the condition is met. For example, the camera application may still require a post-image input from the user to tag a photo with an identity of a person within the photo. A conditional attribute may specify that where images are tagged with a person's identity, an attempt is made to share the tagged photo with the tagged person.

A further example of a conditional parameter may be in the use of conditions to specify a sizing attribute. For images that are to be shared with other devices, users or websites a first sizing attribute may be used if the sharing is performed over a Wi-Fi connection whereas a second, typically smaller, sizing attribute may be used if the sharing is performed over a mobile network connection, in order to minimize data costs.

Some attributes of an attribute set may be specific to photos whereas other attributes may be specific to video files. The application of an attribute may therefore be conditional on whether the image file is a photo file or a video file.

Figure 5:
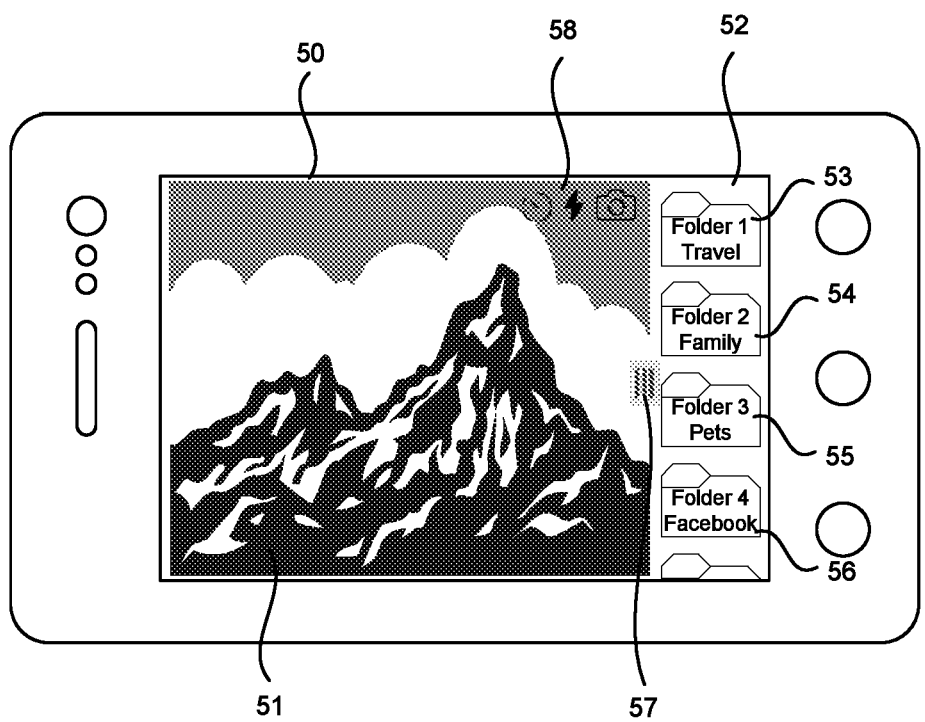
FIG. 5 depicts an image capture interface.

FIG. 5 shows the device 10 rotated through 90 degrees to present the display screen 12 in landscape mode. The display screen 12 displays an image capture screen or interface 50 after the camera application has been invoked on the device 10. The image capture screen includes a live and continuously updated output 51 from the sensor 35. In the present example, the display screen is showing a live mountain scene as recorded via one of the camera lenses onto the sensor 35. The image capture screen 50 includes an album dock or folder list 52 that displays a plurality of icons 53, 54, 55, 56 representing the attribute sets. The album dock 52 may display all of the available attribute sets, also referred to herein as folders or albums, or may display only those albums for which an "enable in album dock" attribute is set to active. Each icon 53, 54, 55, 56 is represented as a folder or album and is associated with a set of attributes. The set of attributes may be unique to the folder. The folder representation allows a user to readily identify a folder in which images recorded using that particular shutter button will be stored. The folders may be given logical names having meaning to the user, such as "Travel", "Family", "Pets", etc. Folders may be created to pertain to particular people, events, activities, etc. Folders may also be created to pertain to accounts, such as a social media account or the like. While four folders are depicted, any number of folders may be created and depicted in the album dock 52. The album dock 52 may be scrollable, e.g. using known touch gesture techniques, to display additional folders in situations where more folders are created than can be simultaneously displayed in the album dock 52.

The folder icons 53, 54, 55, 56 operate as shutter buttons that can each be associated with an image capture function of the camera. When a user selects a particular folder icon, e.g. by tapping with their finger or stylus on the folder icon, the camera application detects the selection and captures the live output of the image sensor 35 as an image. The captured image is processed and stored according to the attributes associated with the tapped folder. For example, if the user selects the "Travel" folder, the image will be recorded and associated with a Travel folder on the device. The travel folder may also have sharing attributes that dictate whether or not the recorded image stored within the travel folder can be viewed by others and/or is to be shared on a social media website, for example. The folders may be navigable outside of the camera application, e.g. through various gallery or folder exploring applications on the device 10.

While the shutter buttons 53-56 are represented as folders, other icons may be utilized. For example, the shutter button may be an icon that is more intuitively identifiable as performing a camera shutter function. The icon may be labelled to indicate the folder and/or attributes associated with the shutter icon.

The image capture screen 50 may include additional settings icons 58 for adjusting and toggling the settings of the camera application. The image capture interface 50 shows icons for the flash and timer settings as well as an icon for toggling the camera between the front lens 16 and rear lens 21. Other adjustable settings include a toggle between camera mode and movie mode with many more adjustable settings being apparent to the person skilled in the art.

Figure 6:
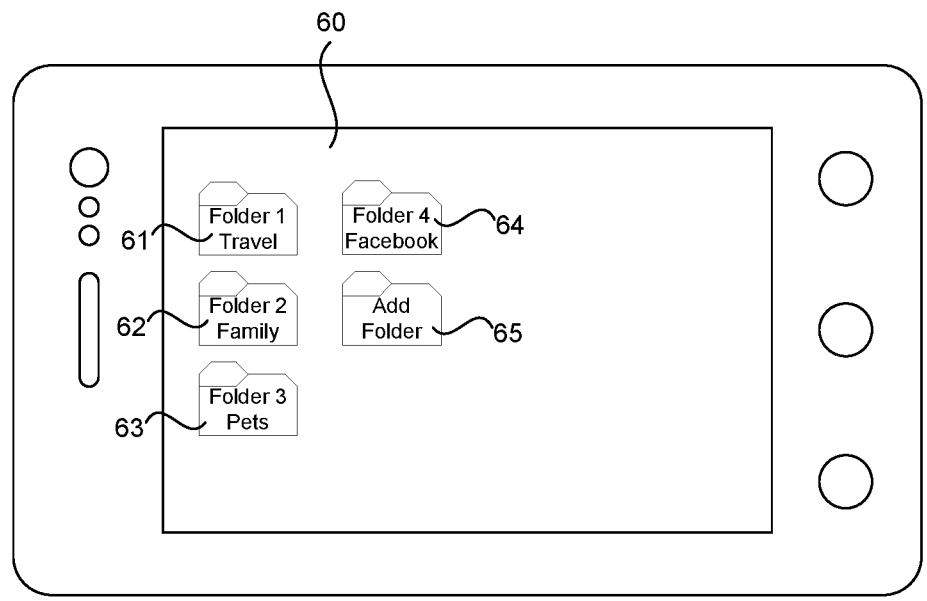
FIG. 6 depicts a folder management interface.
Figure 7:
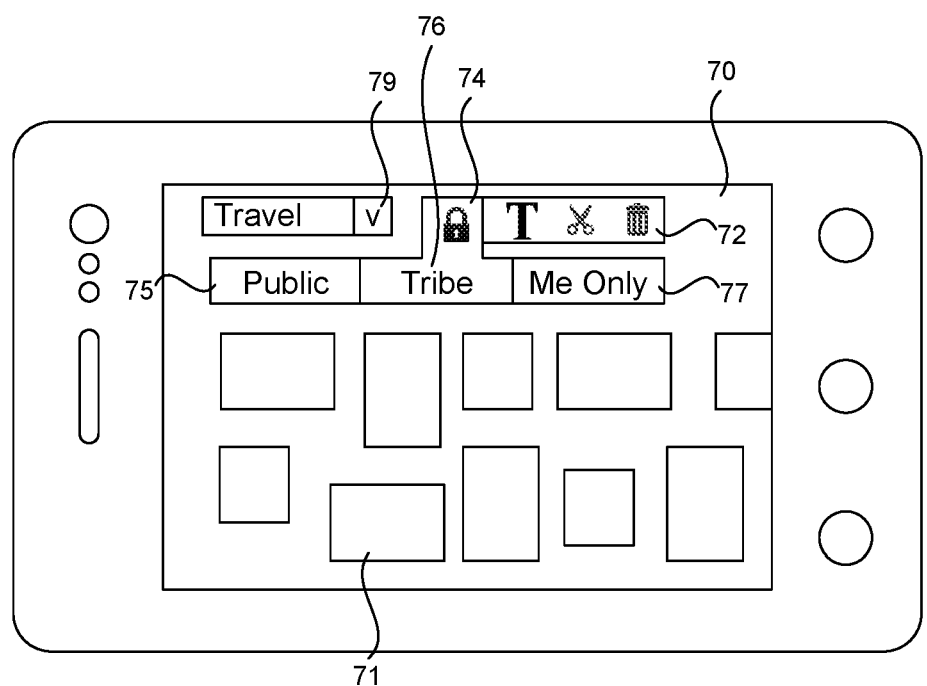
FIG. 7 depicts a specific folder management interface.

The image capture screen 50 may include a folder management tab 57 that when selected, enables the user to manage the folders. An initial folder management screen 60 is shown in FIG. 6. The folder management screen shows all of the created folders 61, 62, 63, 64 as well as a new folder icon 65 for adding a new folder. When a specific folder is selected, a specific folder view 70 is displayed, as shown in FIG. 7. The specific folder view 70 shows the current contents 71 of the folder, e.g. as thumbnail images, as well as an attribute management tab 72. The user may change the folder presented by selecting the appropriate folder from a drop down menu 79. The attribute management tab 72 includes various icons for setting and controlling the attributes of the folder as well as performing other management operations on the contents of the folder. In the illustration, the sharings tab 74 has been selected allowing the user to specify the attribute value for the sharing attribute. The sharing attribute value may be selected as "Public" 75, "Tribe" 76 or "Me Only" 77. Public sharing will allow anyone to subscribe to and/or view the contents of the folder. Tribe will limit the sharing to a friends list while Me Only will limit the folder to the user. Other attribute values will be apparent to the person skilled in the art. While a limited number of attributes are shown in FIG. 7 for clarity, the person skilled in the art will recognize that greater or fewer attributes may be presented and set through appropriate attribute tabs. The format and layout of the attribute tabs may be any convenient format and may be different to the format and layout depicted in FIG. 7.

A user may have any number of folders. Each folder may be directed towards particular timeframes, activities, events, people, etc. The examples show folders for Travel, Family, Pets as well as blank folders that may be added and dedicated to other subjects pertinent to the specific user.

By displaying multiple shutter buttons 53, 54, 55, 56 on the image capture interface, the user is able to pre-categorise images and apply attributes to those images as the image is captured with minimal or no input required from the user after the shutter button is activated. Specifying the attributes of an image as the image is captured through the use of an attribute-specific shutter button, the user is saved from the burden of performing post-capture processing tasks such as sorting, categorization and sharing. A further advantage is that successively captured images can have different attribute sets applied to them by selecting different shutter buttons on the image capture screen.

From a memory perspective, each folder may be a virtual container for images with the actual image being stored in the user's root folder as a flat structure, e.g. raw image data. Links and pointers from the virtual folder may address the image in the root structure in order to associate the image with the respective folder. This allows a single image to be linked with multiple folders and/or multiple attribute sets without necessarily requiring multiple copies of the image to be stored on the device. In an alternative embodiment, each folder may store the image within the folder so that where multiple attribute sets are to be applied to an image, there may be a copy of the image in each respective folder.

In an alternative embodiment, instead of a plurality of attribute associated shutter buttons, the camera application is programmed to provide an attribute setting prompt whenever the camera application is invoked, i.e. prior to enabling an image capture screen. Each invocation of the camera application invokes a corresponding image capture session in which the selected attribute set is applied to all images captured within the session. Thus, only one shutter button is required on the image capture screen.

Figure 8:
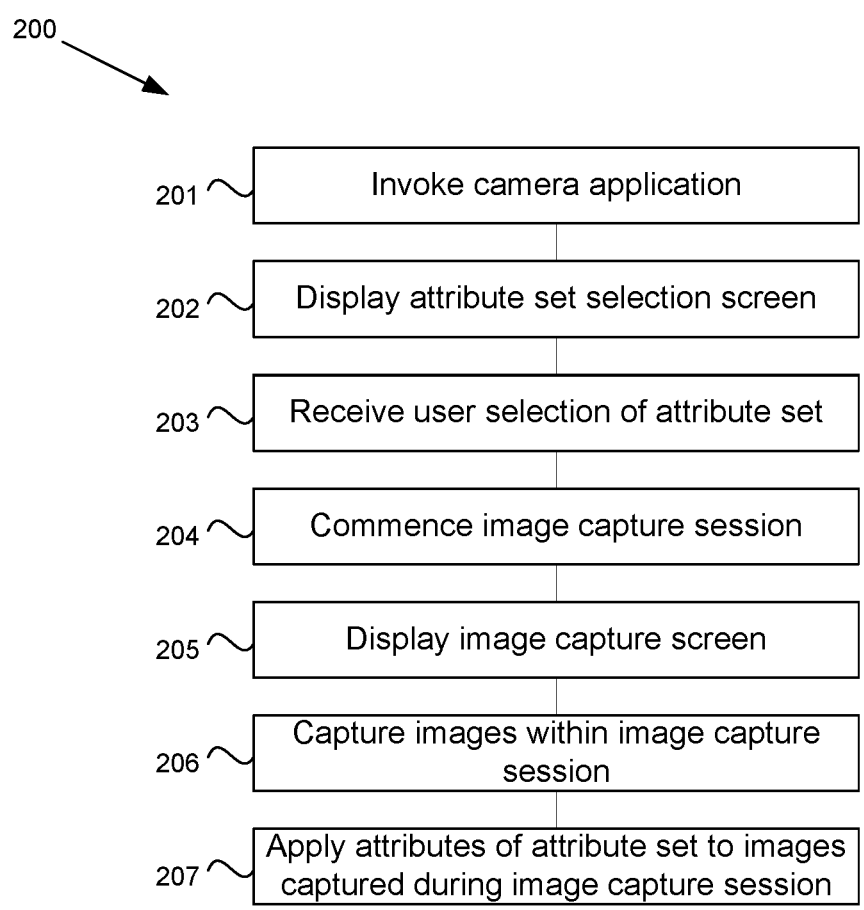
FIG. 8 is a flowchart of an alternative image capture method.

A method performed in accordance with an alternative embodiment of the present invention is depicted in the flowchart 200 of FIG. 8. At step 201, the camera application is invoked, e.g. by selecting a camera application icon for the camera application. In response to invocation of the camera application, the camera application commences execution by initially displaying an attribute selection screen on the display (step 202), i.e. prior to displaying any image capture screen. At step 203, the camera application receives a selection of an attribute set from a user input and commences an image capture session (step 204) by displaying an image capture screen (step 205). In one embodiment, the image capture screen displays an image as recorded through one of the camera lenses. At step 206, the user records one or more images, such as photos and/or movies. At step 207, the attributes of the attribute set are applied to each image recorded by the camera application. When the user is finished capturing the images, the image capture session terminates.

Each attribute set may contain one or more attributes. Multiple attributes sets may be available for selection on the attribute set selection page that is initially displayed to the user in response to invoking the camera application. The attribute set selection page may be similar to the folder view 60 of FIG. 6. That is, selecting a particular folder selects the attribute set for the ensuing image capture session.

The image capture session may terminate by the user specifically closing the camera application, by the user selecting an alternative application, by answering a telephone call on the device 10, by timeout, or by selecting a home screen or back button. In addition, the image capture session may terminate if the user selects a folder view that returns the user to the attribute set selection page. When the user re-invokes the camera application, the camera application will again display the attribute selection screen prior to a new image capture session commencing.

The camera application may be programmed to apply at least some of the attributes of the attribute set(s) selected for an image capture session as each image is recorded. Alternatively, the camera application may be programmed to apply the attributes of the attribute set(s) selected for an image capture session at the closure of the image capture session. In some instances, it may be practical to apply some attributes as soon as an image is recorded, e.g. for storing the image, while other attributes, e.g. resizing and sharing an image to other devices, may be more practically applied at the closure of the image capture session.

An advantage of this alternative embodiment is that the user may set an attribute set for an entire image capture session and does not need to make an attribute selection for each image that is captured. A further advantage is that multiple attribute sets may be selected for an image capture session. When multiple attribute sets are selected, multiple copies of an image may be created and stored, either in the user's root directory or in the respective folders, to enable each copy of the image to be processed in accordance with the required attribute set.

For any of the embodiments described herein, where the settings for a shutter button, folder or image are that the images will be published, uploaded or otherwise made available to the public or to a private group, there may be provided a function that prompts the user to confirm publication prior to the publication action. The prompt may be provided per photo or per batch of photos and may be provided as each photo is taken or when a batch of photos is to be published, synchronized or shared. Other ways of confirming publication of a photo will be apparent to the person skilled in the art.

Figure 9:
FIG. 9 depicts an image capture interface of a camera application.

FIG. 9 shows an embodiment of an image capture interface 90. The image capture interface 90 includes a live output 92 of the image sensor of the active camera. On the left side of the live image is a list of selectable camera settings 94 including without limitation, a flash setting, preview of last capture image, aspect (normal, panorama, macro). On the right side of the live image is the album dock 96 displaying icons representing albums for Honey, Weddings, Selfies and Family. In the embodiment of FIG. 9, a central icon 97, (in this example the Honey album icon) pops out of the album dock list and is made more prominent by displaying the icon to the left of the album dock. Only when the prominent icon is tapped will the image capture function of the camera be executed. The icon that is associated with the image capture function of the camera can be changed by scrolling, e.g. swiping, along the album dock list until the desired icon is centred.

The user may exit the image capture interface by selecting the ALL button 95 which will take the user to a view of all albums. If a user desires to go to a specific album displayed in the album dock, the user may first select a lock button 99 that prevents the album icons from operating as shutter buttons and then selecting the relevant album icon from the album dock list.

The central icon 97 may be made prominent by colouring the icon differently, providing a different border or background to the icon, changing the size of the icon, or shifting the location of the icon in the list. Any or all of these techniques may be employed. A person skilled in the art will readily understand that additional techniques for making one or more of the icons more prominent relative to the others may be used to indicate the respective icon as an active shutter button.

Figure 10:
FIG. 10 depicts an album viewing interface displaying a list of all albums.

FIG. 10 shows a folder viewing interface 600 that is displaying all albums as a scrollable list. The album interface includes a list of albums 610 represented by respective icons 612. In the viewable list, albums for Family, Food, Friends, Pets, Selfies and Weddings are shown. These albums are provided by way of example only and are not considered to be limiting in any manner. The number and category of albums is configurable by the user. The Album view provides a summary of the contents of each album, including whether the album contains sub-albums. Each album includes a settable attribute 614 that toggles whether or not the album is displayed as a shutter button in the album dock on the image capture interface. A current album dock 616 is depicted at the bottom of the album view. Each of the albums of the album view may be selected to display further details and attributes of the album.

Figure 11:
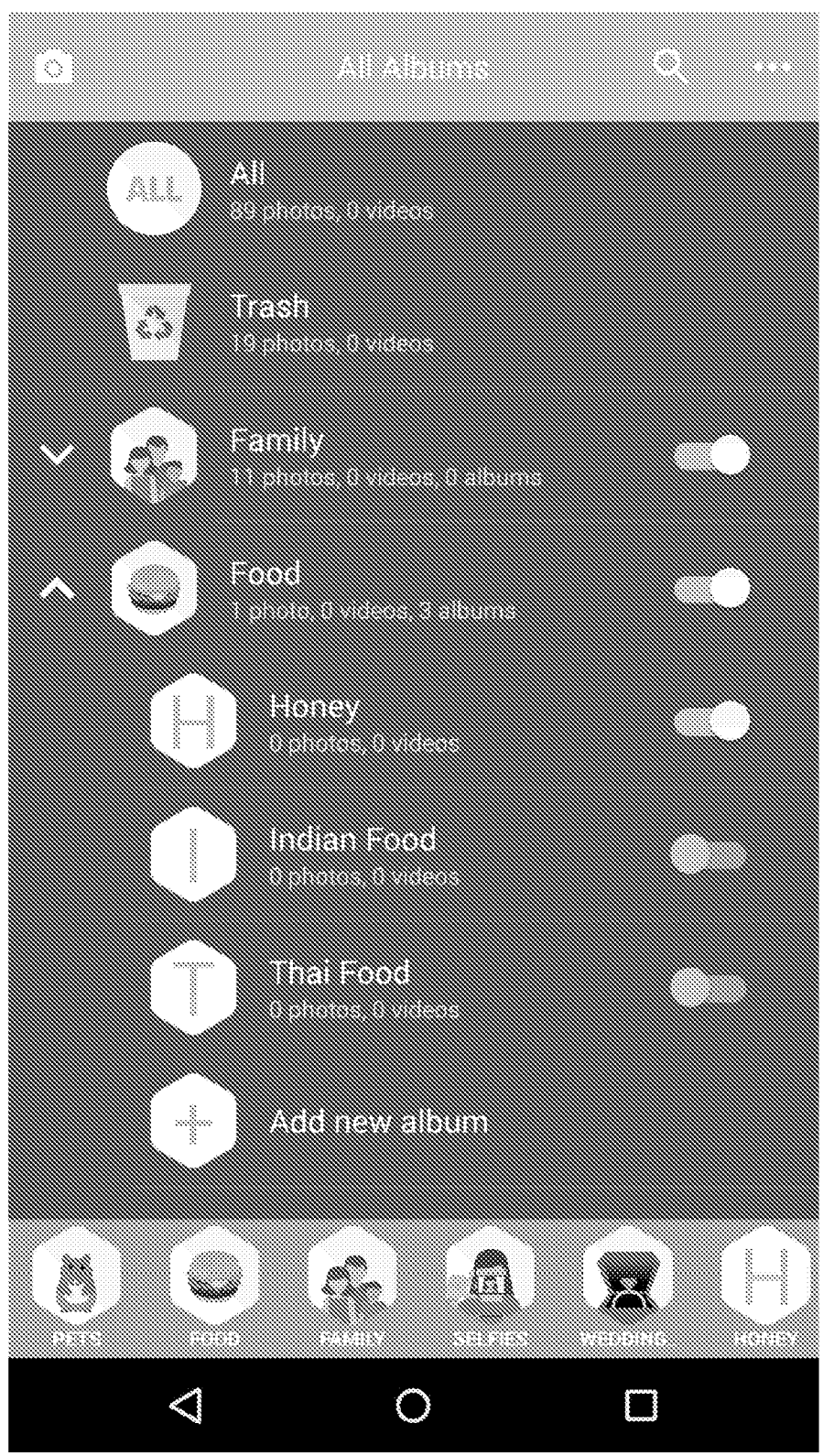
FIG. 11 depicts the album viewing interface displaying sub-albums.

FIG. 11 shows the album view when the Food album is selected. In the present example, the Food album contains sub-albums for Honey, Indian Food and Thai Food. Each of the sub-albums includes a content summary and a toggle for enabling the sub-album to be displayed in the album dock.

Figure 12:
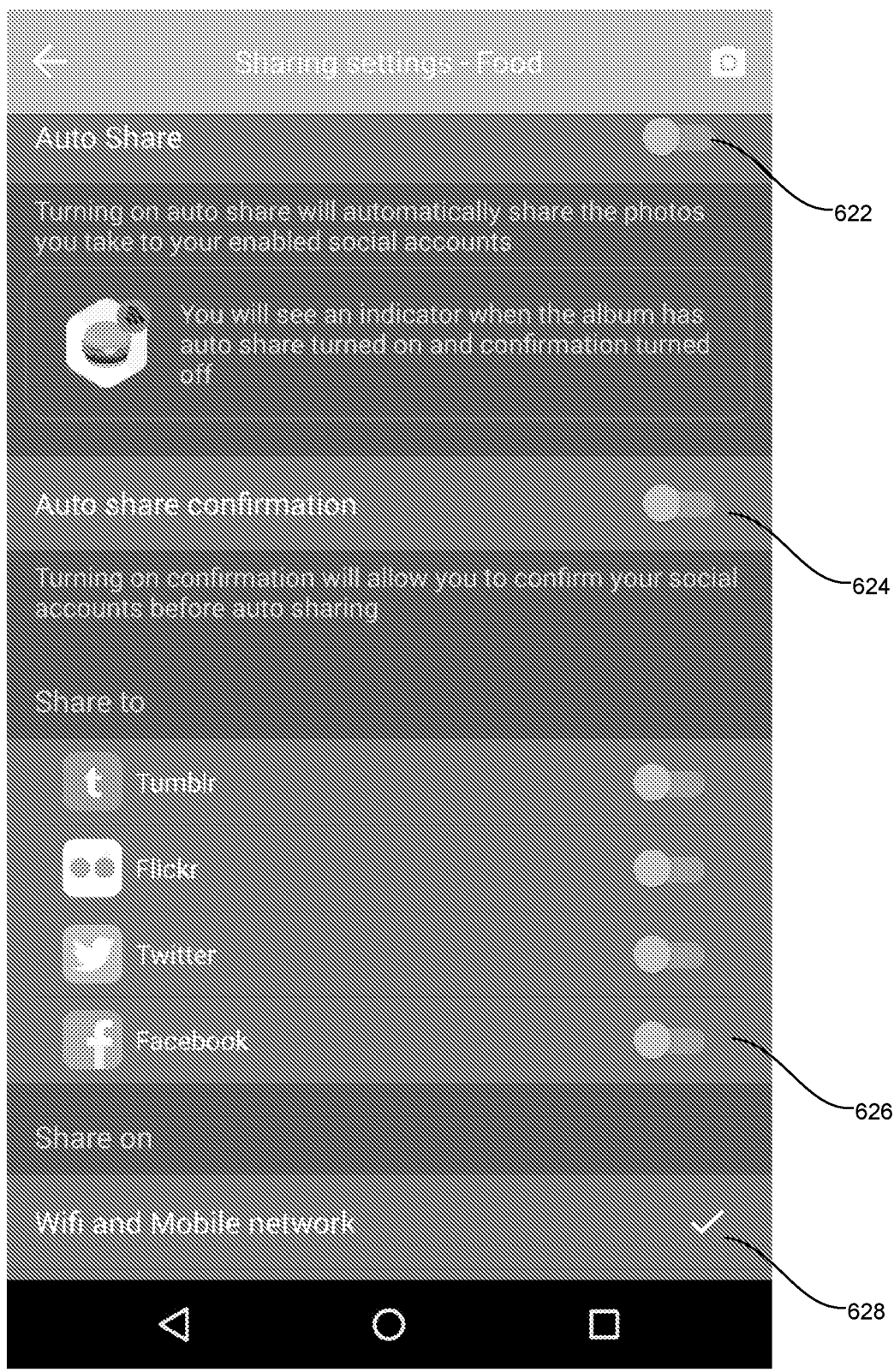
FIG. 12 depicts an interface for setting the sharing attributes of an album.

FIG. 12 shows a sharing settings view for the Food album. The settings view includes toggles for Auto-Share 622 and Auto share confirmation 624 attributes. Enabling the Auto-Share attribute cause the images taken using the associated shutter button, i.e. the Food shutter button, to be shared to one or more specified accounts. The Auto-Share Confirmation attribute will cause the camera application to prompt the user to confirm the image and the accounts to which the image will be shared. If the confirmation is not enabled, the photo will be shared automatically, subject to other attributes such as network availability. Where the attributes of an album are set to share an image automatically, i.e. without further user input, the icon representing the album in the album dock may be modified to reflect the Auto-sharing, thereby providing the user with a passive warning whenever the user activates the image capture function with that album icon.

The sharing attributes may include one or more accounts 626 to which the images will be shared. The sharing attributes may also specify any network attributes 628 that indicate requirements for sharing images, e.g. whether the image can be shared on a mobile network, a WiFi network, etc.

Figure 13:
FIG. 13 depicts a sharing interface with disabled sharing accounts.
Figure 14:
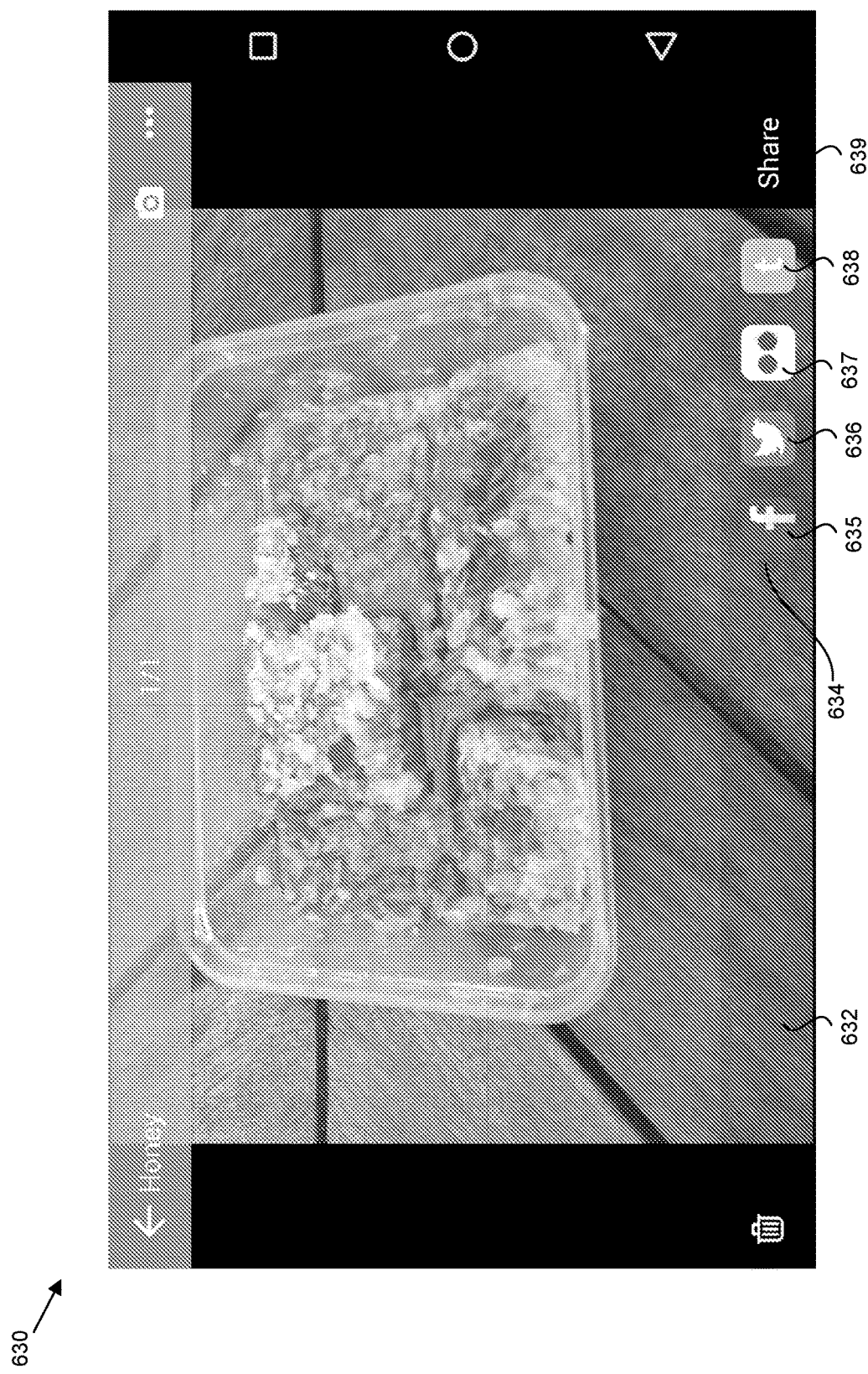
FIG. 14 depicts the sharing interface with enabled sharing accounts.

FIG. 9 described above shows the live image on the image capture interface as an image of a sample of honey, though the particular image is for example only. FIG. 13 shows a post image capture display 630 of the image capture interface in response to the user selecting the Honey icon to invoke the image capture function of the camera. The live image is thus recorded and stored in the Honey album. The image capture interface may display the recorded image 632 and begin to apply the sharing attributes to the recorded image. A sharing interface displays 634 the available social network accounts to which the image may be shared. However, in the present example, the user has not selected any accounts and all available accounts are shown as greyed out. The user may select the accounts by toggling an icon for the respective account between inactive and active states. FIG. 14 shows the sharing interface 634 after the user has activated the Facebook™ 635, Twitter™ 636 and Flickr™ 637 accounts but left the Tumblr™ 638 account inactive. The user may simultaneously share the photo to these accounts by pressing or otherwise activating the Share button 639.

Figure 15:
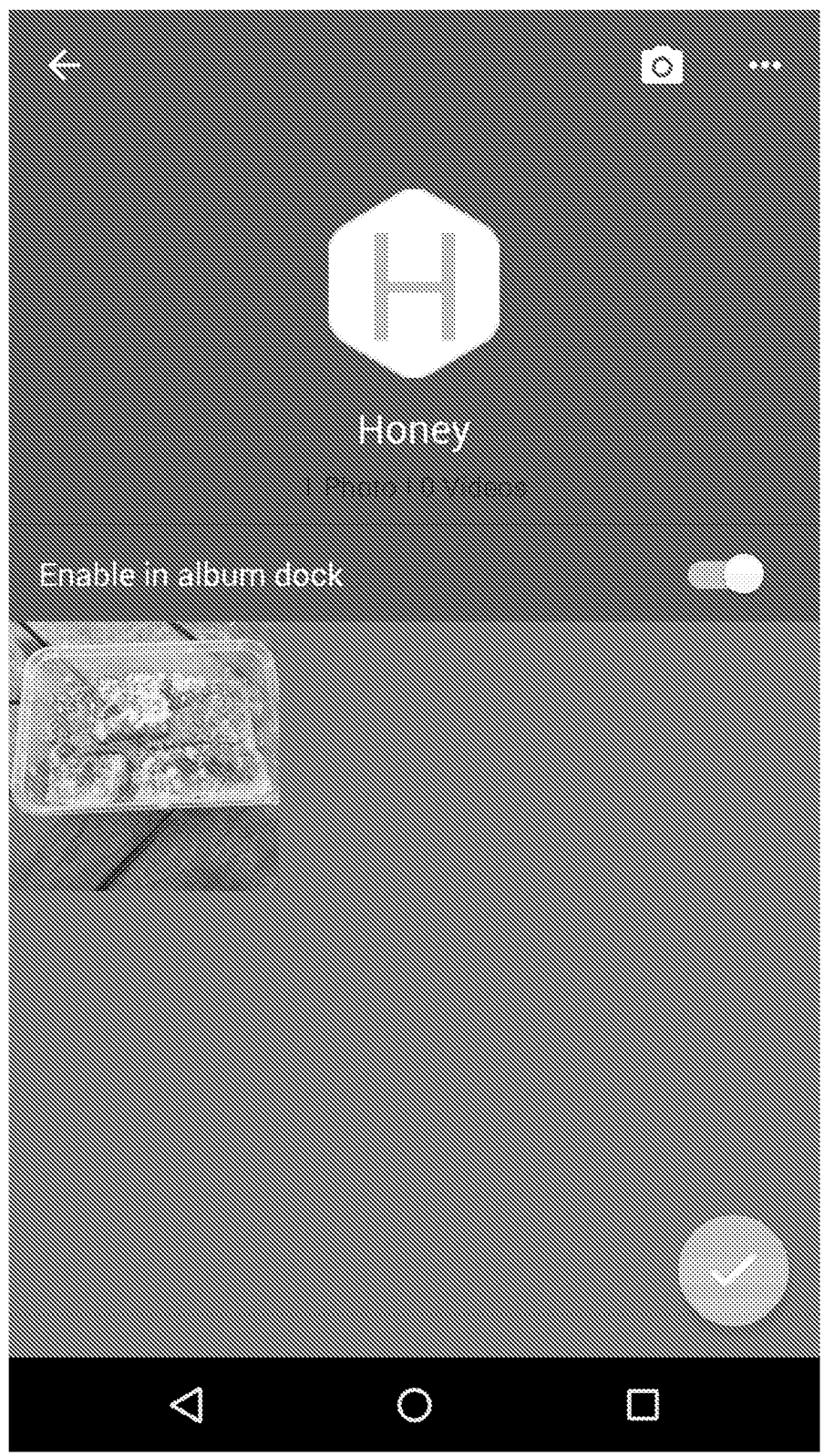
FIG. 15 depicts the contents of a sub-album.

In the present example, a single image is shared to multiple accounts simultaneously. The user can also use the album view to select multiple images within an album and share the multiple photos simultaneously to multiple accounts, e.g. of social networking sites. The user may also be given the option to tag images with additional information, such as a description, location, identity of persons involved, etc. An example of the album view for the Honey sub-album is shown in FIG. 15.

Figure 16:
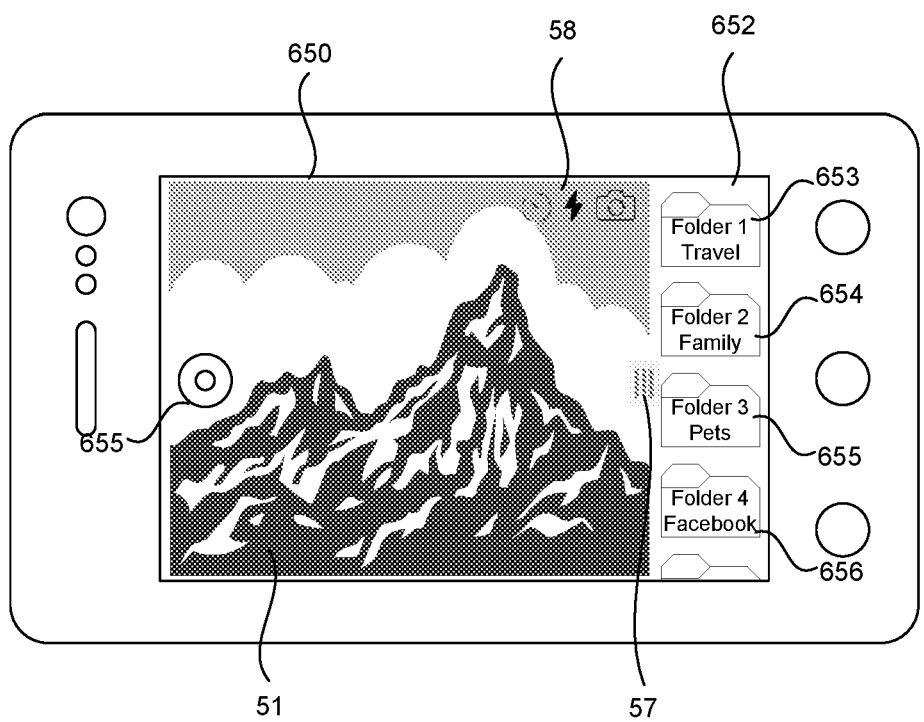
FIG. 16 depicts an alternative image capture interface.

In several of the embodiments described above, each album icon on the image capture interface can be individually associated with the image capture function. In an alternative embodiment, multiple albums can be simultaneously associated with the image capture function. For example, multiple icons can be toggled between active and inactive states through an action, such as pressing and holding the icon. When multiple icons are active, pressing and quickly releasing any of the active icons, in particular the centered icon in the album dock, may activate the image capture function. An alternative embodiment for simultaneously associating multiple albums with the image capture function is depicted in FIG. 16. In this embodiment, the image capture interface 650 displays the album dock 652 with each album 653, 654, 655, 656 being able to be toggled between active and inactive states by tapping the respective icon. Activating an icon highlights the icon to indicate that the album is actively associated with the image capture function of the camera. The image capture interface 650 includes a specific image capture button 658 that can activate the image capture function by pressing the button. Pressing the button 658 causes an image to be recorded and associated with each of the active albums, including applying any storage, sharing, resizing or other attributes of the respective album.

In an alternative embodiment, multiple albums may be associated with the image capture function on a distinct and separate interface to the image capture interface. In this embodiment, the album dock of the image capture interface may be used to indicate all of the albums actively associated with the image capture button.

Figure 17:
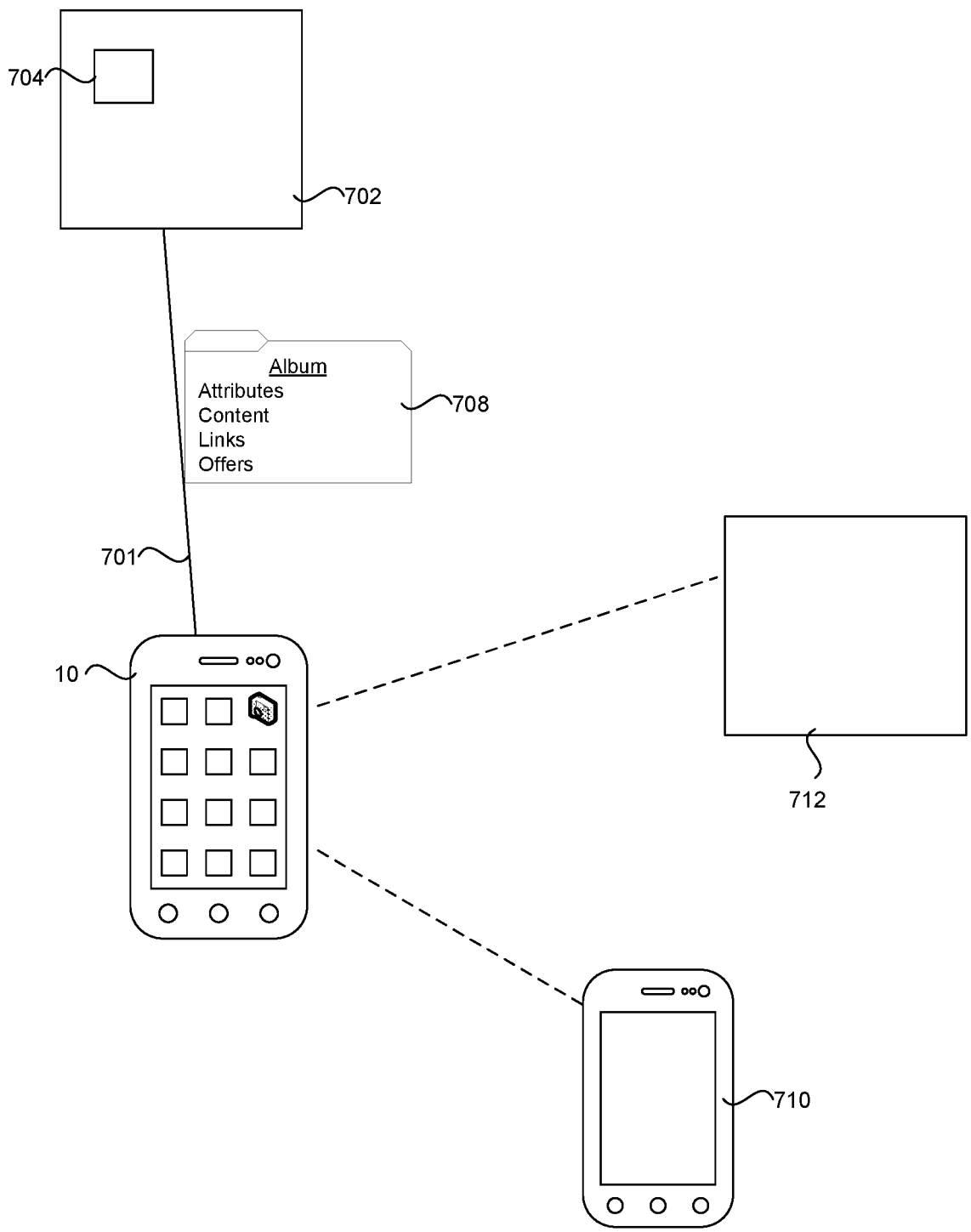
FIG. 17 depicts a network for downloading albums to a device.

The album views herein described show albums that will typically have been created by the user, though one or more albums may have been installed as default albums during installation of the camera application on the camera device. In addition, the user may be able to download albums from a third party resource. FIG. 17 shows the ability of the device 10 to communicate with additional resources. In one embodiment the device 10 may be able to communicate through mobile or WiFi protocols represented by a network connection 701 with a server 702 that includes an application store 704. The application store 704 may store downloadable albums from the camera application provider, the network provider, or any other third party provider. In one embodiment, the camera application provider may pool albums from multiple third party album providers into a single directory of albums that can be easily searched and downloaded to the device 10 by the user.

A downloaded album 708 may include, without limitation, one or more of attributes, content, links, offers though other content items will be apparent to the person skilled in the art. When an album 708 is downloaded to the device 10, it may be installed on the device 10 with a pre-configured set of attributes. Pre-configured attributes may include, without limitation, an album name, an album category, and pre-setting of the "enable in album dock" attribute. If the album dock attribute is preset to enabled, the album will automatically appear in the album dock immediately after the album is installed. The pre-configured attributes may also include one or more sharing attributes. The one or more sharing attributes may specify a social network account that is not directly owned or operated by the user but is instead owned, operated or otherwise administered by the third party album provider. For example, the sharing attributes may specify a Facebook account, one or more Twitter hashtags, Instagram accounts, etc. The sharing attributes may specify one or more authorization and/or subscription attributes that allows a user to submit images to the social network account of the third party provider.

FIG. 17 also shows the ability for the device 10 to communicate with other album resources, including additional phone/camera devices 710 or a static resource 712. In one embodiment, the device 10 may use near-field communications such as Bluetooth™ or other point to point sharing services to receive albums into the device.

The ability to download and install pre-configured albums provides a range of possible opportunities for the camera application.

Event Embodiment

A user may be attending an event, such as a concert, sporting event, or similar performance. The user may download an event album to the device 10. The event album may be downloaded through an application store. Alternatively or in addition, an event server at the event may use location based services, e.g. near field communications or proximity sensing, geo-fencing etc to detect the presence of the device 10 and then prompt the user to download and install the event album from the event server.

The event album may include pre-configured attributes that can be applied to images recorded when the event album icon is used in the album dock of the image capture interface to invoke the image capture function. The supplied attributes may include sharing attributes that indicate one or more social networking accounts to which the user may share images of the event. For example, the event administrators may create a dedicated Event wall on Facebook™ and provide a sharing link to the event wall in the event album. When a user records an image using the event shutter button in the event dock, the image may be shared to the Event wall, subject to additional attributes including the auto-share and confirmation attributes as well as any moderation attributes set by the event administrators. Images may be shared to other social networking sites by pre-configuring additional links, URLs, hashtags, etc.

In one embodiment, sharing an event image to the pre-configured link may trigger a subsequent action. For example, the user may be provided with an offer to pre-purchase concert tickets, download exclusive content, etc. as an inducement to share event images.

In addition to the sharing attributes, the event album may be provided with additional content such as event information, information for related events, venue information, special offers, etc. For example, a musical event may provide content or links pertaining to featured bands, discography, history, etc. Music samples and/or exclusive content may also be provided. A sporting event album may contain match day information, stadium seating plan or map, special food or beverage offers, team lists, player profiles, videos of player interviews, highlights, etc.

A particular event may be a wedding event. A couple to be married may establish a wedding wall on a social networking site. Alternatively or in addition, the couple may create an internet cloud directory. The wedding couple may provide a wedding album that can be downloaded to the devices of wedding guests. The wedding album may specify the wall or directory in the sharing attributes of the wedding album and may include one or more authorization attributes that allow the guest to subscribe to the wall or directory. Guests may use the wedding album in the image capture interface of their respective devices to record wedding images and automatically share the images to the wall or directory.

The person skilled in the art will readily understand that it is not essential for a wall or directory to relate to a particular event. Any user may be able to make an album pertaining to a group and to share that album with members of the group.

Seminar or Conference Embodiment

A user attending booths at a conference may download and install an album pertaining to the booth operator using the download and/or near-field communications techniques described above. As part of the download process, the user may provide some identity information to the booth operator, thereby facilitating the booth operator to create a booth attendance list. The booth album may include preconfigured attributes as well as additional content such as company information, catalogue, company website link, videos of product demonstrations, etc. As the user peruses the booth, the user may capture additional information using the album icon in the album dock so that the recorded information is automatically stored in the booth album. The sharing attributes may allow the user to share a recorded image to a resource controlled by the booth operator. For example, if the user takes a photo of a product sample and shares the photo to the booth operator, this may trigger the booth operator to undertake an additional task. For example, the booth operator may provide additional detail on the product, provide a quote, assign a sales agent to make a follow up call, etc.

Retail Embodiment

A user may download a store album, for example pertaining to a clothing store. The store album may include store album attributes to be applied to recorded images as well as additional content. The additional content may include a link to an online site of the store, directory of store locations, catalogue, etc. The store album may include special offers to users who have downloaded the store album, which may be a one-time offer or a recurring offer. The store album may be downloaded from an application store. Alternatively, a store server at the location of a store, e.g. in a shopping mall, may detect when a user enters a store and prompt the user to download the store album through near field communications.

In one embodiment, the store album may include sharing attributes that encourage the user to share images recorded by the user using the store album to a social network account operated by the store. In particular, the store operator may desire to receive images of the user wearing store merchandise. In response to sharing the images, the user may be rewarded with an offer, such as a discount on the next purchase, exclusive item purchase, free items, etc.

Many users will record images from store changerooms as they try on store merchandise and then send the photos to friends, relatives, etc. while still in the changeroom or store to seek opinions and approval for the merchandise. Using the store album, the user may share recorded images to their friends and relatives as well as to a store site. In one embodiment, the sharing attributes of a store album may specify images to be shared to a device of a store attendant. The store operator may respond to receiving the image, in real time, i.e. while the user is still within the store, by providing an inducement to purchase the item within a timeframe, e.g. 30 minutes. Alternatively or in addition, the store operator may also provide accessory suggestions, sizing suggestions, or any other tips, advice or information. While the present example relates to a clothing store, the concepts of the example will equally apply to many other types of product and service retail and wholesale.

From the above examples, it can seen that downloadable albums can operate as mini-websites by providing preconfigured attributes, contents, links, offers, etc.

Day Care Embodiment

Some day care and similar childminding centres are regulated such that the centre operator is required to provide a report and evidence to parents and/or regulators that a child is being adequately cared for. The camera application as described herein can be configured to facilitate information capture and reporting for a day care centre.

Figure 18:
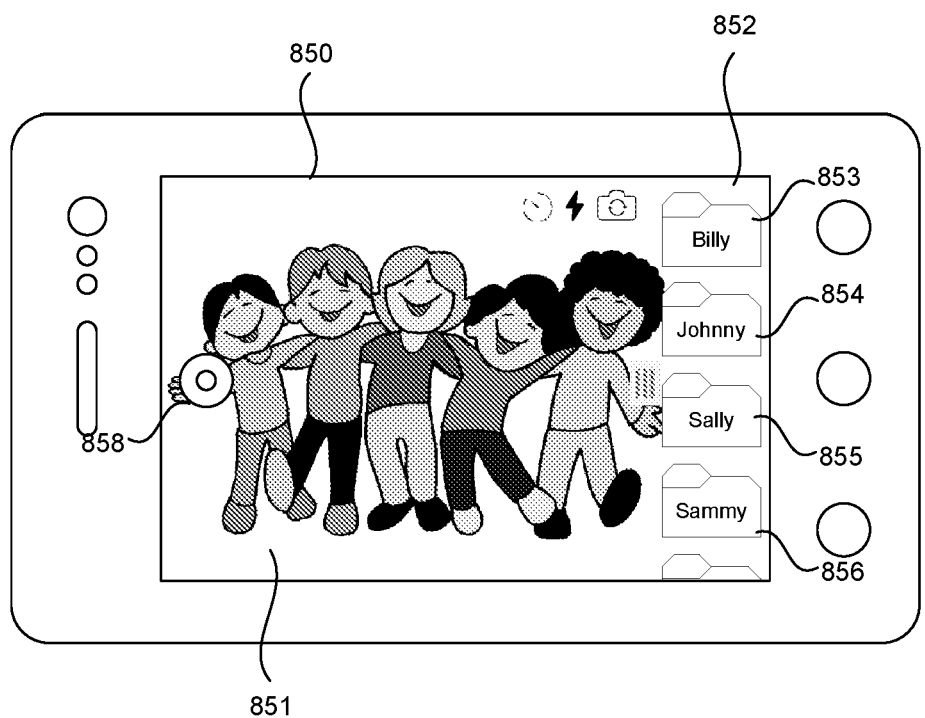
FIG. 18 depicts an image capture interface for use in a child care embodiment.

A configuration of the image capture interface 850 of the camera application is depicted in FIG. 18. In this embodiment, each child may be assigned an album and the album dock 852 is depicted with albums pertaining to Billy 853, Johnny 854, Sally 855 and Sammy 856. Each child album may have sub-albums pertaining to various activities, such as eating, sleeping, socializing, play, etc. The sharing attributes of these albums may be set so that recorded images are shared to the parents and/or regulators. Sharing may be performed through internet cloud based directory services, such as Google Drive™, Microsoft OneDrive™ etc. in which the parents are granted access directly to the albums. Alternatively or in addition, the images may be attached to an email, with potential resizing if required, and transmitted to an email address of the parents specified in the sharing attributes of the respective album. Other sharing methods will be apparent to the person skilled in the art.

The day care center operator can move about the day care center and record images of the children using the camera application. When an image is to be recorded, the operator will select the album on the image capture interface corresponding to the relevant child/activity so that the recorded image may be automatically stored in or otherwise associated with the relevant album. The image capture interface may be configured to allow multiple albums to be actively associated with the image capture function simultaneously, e.g. where the image will capture multiple children and/or multiple activities. An image may be recorded by pressing the image capture function button 858.

When the day care centre is required to produce a report, e.g. at the end of a day, week, etc., the operator can open an album view for a particular child, select images to share, and then select a share function which will apply the sharing attributes for the album to the selected images. Alternatively, images can be auto-shared as described previously thereby removing the need for any manual reporting, other than the process of recording the images. These processes of automatically associating recorded images with specific albums pertaining to individual children can save significant amounts of administration time when it comes to reporting. A particular advantage is that parents can be provided with video images of their children which can provide greater evidence of particular activities, such as socializing, than can be achieved through still photos or text based reports.

The sharing of images can be performed directly from the camera device. Alternatively or in addition, the camera device may be set to synchronize with additional storage devices so that albums on the additional storage devices are automatically updated with images recorded by the camera device. Sharing can then be performed from the additional storage devices based on sharing attributes of the albums.

While the device 10 is depicted and described herein as containing two camera devices as is common on many current day Smartphones, the device 10 may be equipped with any number of camera systems and associated components.

The processing steps described herein, while described discretely, may be steps performed entirely within the memory of the device 10. The results of the individual steps described herein may be files or data that are stored for a time or may be data that only exists within the processing memory, such as within buffers or registers, until subsequent steps are performed. That is, the processing steps described herein may or may not have discrete outputs.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise, comprised and comprises where they appear.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, the scope of the invention being indicated by the appended claims rather than the foregoing description, and all changes which come within the meaning and range of equivalency of the claims are therefore intended to be embraced therein. It will further be understood that any reference herein to known prior art does not, unless the contrary indication appears, constitute an admission that such prior art is commonly known by those skilled in the art to which the invention relates.

The invention claimed is:

1. A camera device comprising:
   (A) at least one processor;
   (B) a camera application executable by the at least one processor of the camera device, the camera application including:
      (a) an image capture function that can be activated by a user; and
      (b) an interface that displays a plurality of attribute sets for allowing a user to select at least one of the plurality of attribute sets to be associated with the image capture function;
      (c) wherein the camera application is programmed such that when the image capture function is activated, the camera application records an image with at least one camera of the camera device and applies at least one attribute of the one or more attribute sets associated with the image capture function to the recorded image;
      wherein the interface is an image capture interface that displays a live output of the at least one camera as well as a plurality of icons representing the plurality of attribute sets;
      wherein at least one of the plurality of icons operates to activate the image capture function such that when an icon of the plurality of icons is selected by the user on the image capture interface, and the camera application responds to the selection by recording an image and applying at least one attribute of the attribute set associated with the selected icon to the recorded image; and
      wherein the plurality of icons is displayed on the image capture interface with at least one icon highlighted to denote the at least one highlighted icon as being actively associated with the image capture function.

2. The camera device of claim 1, wherein the plurality of attribute set icons are individually selectable between an active and an inactive state such that when the user activates the image capture function, the camera application responds by recording an image and applying at least one attribute of each of the active attribute sets to the recorded image.

3. The camera device of claim 1, wherein applying an attribute includes associating the recorded image with at least one folder specified by the attribute set.

4. The camera device of claim 3, further comprising a folder viewing interface for viewing one or more images within a folder having an associated attribute set, wherein the folder viewing interface is programmed to allow the user to select one or more images within the folder and to select a sharing icon that causes the selected one or more images to be shared in accordance with one or more preconfigured sharing attributes.

5. The camera device of claim 4, wherein the folder viewing interface is programmed such that selecting the sharing icon causes the selected one or more images to be simultaneously shared to a plurality of social networking accounts.

6. The camera device of claim 1, wherein the interface allows the user to simultaneously capture an image and select the at least one of the plurality of attribute sets.

7. The camera device of claim 1, wherein applying an attribute includes applying at least one sharing attribute to the recorded image.

8. The camera device of claim 7, wherein applying the at least one sharing attribute includes automatically sharing the recorded image to at least account of at least one social network account specified by the at least one sharing attribute.

9. The camera device of claim 7, wherein applying the at least one sharing attribute includes automatically prompting the user to confirm if the recorded image is to be shared to at least account of at least one social network account specified by the at least one sharing attribute.

10. The camera device of claim 1, wherein the camera application is programmed to:
    download at least one attribute set from a third party resource, the downloaded attribute set including at least one pre-configured attribute; and
    install a downloaded attribute set on the camera device such that the downloaded attribute set may be associated with the image capture function.

11. The camera device of claim 10, wherein the downloaded attribute set includes at least one pre-configured sharing attribute.

12. The camera device of claim 10, wherein the downloaded attribute set includes pre-configured content including at least one of an image, a URL and event information.

13. A camera device comprising:
    (A) at least one processor;
    (B) a camera application executable by the at least one processor of the camera device, the camera application including:
       (a) an image capture function that can be activated by a user; and
       (b) an interface that displays a plurality of attribute sets for allowing a user to select at least one of the plurality of attribute sets to be associated with the image capture function;
       (c) wherein the camera application is programmed such that when the image capture function is activated, the camera application records an image with at least one camera of the camera device and applies at least one attribute of the one or more attribute sets associated with the image capture function to the recorded image, wherein the interface is an image capture interface that displays a live output of the at least one camera as well as a plurality of icons representing the plurality of attribute sets; and wherein at least one attribute of at least one of the attribute sets indicates whether the respective attribute set is displayed on the image capture interface.

14. A camera device comprising:
(A) at least one processor;
(B) a camera application executable by the at least one processor of the camera device, the camera application including:
  (a) an image capture function that can be activated by a user; and
  (b) an interface that displays a plurality of attribute sets for allowing a user to select at least one of the plurality of attribute sets to be associated with the image capture function;
  (c) wherein the camera application is programmed such that when the image capture function is activated, the camera application records an image with at least one camera of the camera device and applies at least one attribute of the one or more attribute sets associated with the image capture function to the recorded image;
  wherein the camera application is programmed to:
    download at least one attribute set from a third party resource, the downloaded attribute set including at least one pre-configured attribute; and
    install a downloaded attribute set on the camera device such that the downloaded attribute set may be associated with the image capture function; and
  wherein the downloaded attribute set includes an attribute that causes the downloaded attribute set to appear on an image capture interface of the camera application.

15. A digital camera enabled device including at least one digital camera for recording an image, the device including at least one processor that executes a camera application, the camera application programmed to:
(A) display a live output of the at least one digital camera as well as a plurality of shutter buttons on an image capture interface, each shutter button representing an associated attribute set, each attribute set including at least one attribute that indicates whether the respective attribute set is displayed on the image capture interface;
(B) detect a user selection of one of the plurality of shutter buttons;
(C) record an image with at least one of the digital cameras of the device in response to detecting the user selection; and
(D) apply at least one attribute of the attribute set associated with the selected shutter button to the recorded image.

16. A digital camera enabled device including at least one digital camera for recording an image, the device including at least one processor that executes a camera application, the camera application programmed to:
(A) invoke a camera application on the device;
(B) in response to the camera application being invoked on the device, display on a display of the device that displays a live output of the at least one camera, by the camera application, an attribute selection display including a plurality of icons representing a plurality of attribute sets and that prompts the user to select an attribute set, wherein the plurality of icons are displayed on the display with at least one icon highlighted to denote the at least one highlighted icon as being actively associated with an image capture function;
(C) in response to receiving a selection of an attribute set, commence an image recording session by the camera application;
(D) record one or more images for the image recording session;
(E) apply, by the camera application, at least one attribute of the selected attribute set to the one or more images; and
(F) end the image recording session by the camera application.

* * * * *